United States Patent [19]

Bodor et al.

[11] Patent Number: 4,656,045

[45] Date of Patent: Apr. 7, 1987

[54] FAT CONTAINING DIGLYCERIDES

[75] Inventors: Janos Bodor, The Hague; Jan Van Heteren, Vlaar dingen, both of Netherlands

[73] Assignee: Lever Brothers Company, New York, N.Y.

[21] Appl. No.: 755,523

[22] Filed: Jul. 16, 1985

[30] Foreign Application Priority Data

Jul. 17, 1984 [GB] United Kingdom ............ 8418154

[51] Int. Cl.$^4$ ........................ A23D 3/00; A23D 5/00
[52] U.S. Cl. .................... 426/601; 426/603; 426/607; 426/611; 426/612
[58] Field of Search .......... 426/601, 602, 603, 604, 426/611, 612, 607

[56] References Cited

U.S. PATENT DOCUMENTS

| | | |
|---|---|---|
| 2,089,470 | 8/1937 | Epstein et al. |
| 3,298,837 | 1/1967 | Seiden ........................ 426/607 |
| 3,623,888 | 11/1971 | Reid ............................ 426/601 X |
| 3,906,117 | 9/1975 | Gawrilow .................. 426/602 X |
| 3,914,452 | 10/1975 | Norris ........................ 426/601 X |
| 4,018,806 | 4/1977 | Wyness et al. ............ 426/607 X |
| 4,228,190 | 10/1980 | Wallgren et al. ......... 426/603 X |
| 4,284,655 | 8/1981 | Miller et al. .............. 426/602 |
| 4,536,411 | 8/1985 | Kirton et al. ............. 426/603 |

FOREIGN PATENT DOCUMENTS 42-1020  1/1967  Japan .

OTHER PUBLICATIONS

Hernquist, L., et al., "Polymorphism of Rapeseed Oil with Low Content of Erucic Acid and Possibilities to Stabilize the B′-Crystal Form in Fats", J. Sci. Food Agric., 1981 32, pp. 1197–1202.

*Primary Examiner*—Robert Yoncoskie
*Attorney, Agent, or Firm*—James J. Farrell

[57] ABSTRACT

Edible fat compositions containing diglycerides or a mixture of diglycerides and monoglycerides, wherein (i) the amount of diglycerides ranges from 5–30%, (ii) the level of saturated $C_{16}$- to $C_{22}$-fatty acid residues in said diglycerides does not exceed 45% and (iii) the ratio of diglyceride to saturated monoglyceride exceeds 8:1 and the ratio of diglyceride to unsaturated monoglyceride exceeds 5:1.

Emulsions prepared from such compositions display butter-likeness and improved spreadability.

18 Claims, No Drawings

FAT CONTAINING DIGLYCERIDES

The present invention relates to edible fat compositions containing one or more diglycerides or a mixture of one or more diglycerides and one or more monoglycerides and to butter-like water- and oil-containing emulsions wherein the fatty phase contains said fat composition.

Products having butter-like properties have an elasticity, a plasticity and a melting behaviour comparable to those of natural butter.

References relating to these properties and their measurements are for instance J. Dairy Res. 8, 245 (1937), Davies J.C. and the British Food Manuf. Ind. Res. Inst. the Rheology of Margarine and Compound Cooking Fats., Part I (Res. Rep. 37) and Part II (Res. Rep. 69), (1956), Prentice J.H.

In view of the highly desirable and appreciated properties of natural butter, several attempts have been made to produce a cheaper substitute which displays said properties.

The products obtained sofar are not fully satisfactory and their production costs are often prohibitive. Moreover, the butter-like texture and melting property are not retained on temperature cycling.

Applicants have found specific fat compositions which meet the above requirements to a great extent.

The invention is based on the discovery that specific diglycerides have a profound influence on the crystallization behaviour of fats.

The edible fat composition according to the invention comprises one or more diglycerides or a mixture of one or more diglycerides and one or more monoglycerides, wherein:

(a) the ratio of diglyceride to saturated monoglyceride exceeds 8:1 and the ratio of diglyceride to unsaturated monoglyceride exceeds 5:1.

(b) the diglycerides are present in a proportion ranging from 5 to 30 wt. % based on the total amount of fat.

(c) the level of saturated fatty acid residues having a chain length varying from 16 to 22 C-atoms in said diglycerides does not exceed 45% based on the weight of the fatty acid residues of said diglycerides.

It is important that the diglycerides or the mixture of diglycerides and monoglycerides crystallize within a temperature range similar to that of the fat composition in which they are incorporated. If the diglycerides or the mixture of di- and monoglycerides are liquid within a temperature range varying from the refrigerator temperature (about 5° C.) to the ambient temperature (25°–30° C.), their influence on the fat is very limited. If, however, the melting point of the diglycerides or the mixture of mono- and diglycerides is too high, this will have a detrimental effect on the organoleptic properties (melting behaviour) of the fat composition and the emulsions prepared therefrom. It is advantageous that the diglycerides or the mixture of di and monoglycerides in the fat composition melt between 20 and 40° C. and preferably between 25° C. and 40° C. This is mainly influenced by the level of $C_{16-22}$ fatty acid residues, as stated above. The preferred level of these residues ranges from 5 to 35 wt. %, based on the total weight of the fatty acid residues of the diglycerides.

Further characteristics of the diglycerides and particularly the level of $C_{12}$- and $C_{14}$-saturated fatty acid residues, the level of mono-cis and di-cis unsaturated fatty acid residues, and finally the level of mono-trans unsaturated fatty acid residues require some attention.

Generally the level of $C_{12}$- and $C_{14}$- saturated fatty acid residues will range from 0 to 35 wt. % and preferably should be as low as possible, particularly between 0 and 15 wt. %.

The level of mono-cis and di-cis unsaturated fatty acid residues with a chain length of 18 or more carbon atoms in the diglycerides will generally not exceed 70 wt. % and preferably ranges from 25 to 65 wt. %.

The level of mono-trans unsaturated fatty acid residues with a chain length of 18 or more carbon atoms can be 0% but should not exceed 70% and preferably ranges from 5 to 60 wt. %.

The preferred diglycerides are for the purpose of this invention selected from the group consisting of diglycerides from 1 palmitic acid or stearic acid residue and 1 oleic acid residue, diglycerides from 2 elaidic acid residues and diglycerides from 1 elaidic acid- and oleic acid residue.

Amounts of diglycerides which are suitable for imparting butter-like properties, preferably range from 10 to 20 wt. % based on the total fat composition and ideally on the amount of fat in the composition which is crystallizable within the temperature range of 5°–35° C.

Several combinations of diglycerides within the above definitions can be used. These combinations will result in a fat composition having an acceptable fat solids profile (percentage of solid fat measured by NMR at various temperatures) which generally correspond to the following values:

$N_{10} \leq 55$: $N_{20} = 8-25$; $N_{30} = 0-6$; $N_{35} = -3$.

The diglycerides can be introduced in the fat composition as pure chemical compounds or as mixtures with saturated and unsaturated monoglycerides.

Monoglycerides seem to have a negative effect on the performance of the diglycerides. Saturated monoglycerides have a more negative effect than the unsaturated monoglycerides. The ratio of diglycerides to saturated monoglycerides preferably exceeds 10:1 and the ratio of diglycerides to unsaturated monoglycerides preferably exceeds 6:1.

The diglycerides or the mixture of mono- and diglycerides useful for the purpose of the present invention may consist of the residual product from the distillation of monoglycerides which has optionally been subjected to further fractionation to isolate purified diglycerides.

It is also useful and very convenient to produce diglycerides by glycerolysis of part of the fat or of a fat component of the fat composition wherein they are incorporated.

The diglycerides of the fat compositions according to the invention preferably consist of a mixture of diglycerides obtained by interesterification of a fat or of a fat component of the fat composition, in the presence of an alkalihydroxide and an amount of glycerol which may range from 0.5–3 wt. % (based on the weight of the fat subjected to glycerolysis) and a conventional interesterification catalyst such as an alkaliglycerolate or an alkaliethanolate.

Excess monoglyceride formed during interesterification can be removed by physical methods such as chromatography or by chemical methods e.g. by treating the mixture with an alkali under conditions leading to hydrolysis of the monoglyceride and subsequently removing the soap produced therefrom.

The oils and fats used to produce the edible fat compositions according to the invention can be of animal or vegetable origin and may include, for instance, palm oil, lauric fats, soybean oil, sunflower oil, safflower oil, rapeseed oil, maize oil, fish oil, tallow, lard, butterfat, in hydrogenated or non-hydrogenated form, including fractions obtained by dry or wet fractionation and interesterified mixtures obtained from these fats. These fats can be blended in a way known per se to produce suitable margarine fat blends as for instance described in "Margarine", A. J. Andersen and Williams, Second Revised Edition, Pergamon Press.

Applicants have made the observation that the use of diglycerides had a particularly beneficial effect on the spreadability of hard fats and particularly dairy butter. The spreadability of butter seems to be very much promoted by the presence of diglycerides.

The present invention also relates to the production of edible oil- and water-containing emulsions, particularly of the margarine type and of the reduced fat spreads type (containing e.g. 20–60% of fat) where the fat phase contains a fat composition as described above and preferably constitutes the continuous phase of the emulsion.

Such emulsions are produced in a way known per se, by emulsifying an aqueous phase with a fatty phase and subjecting an emulsion thus obtained to a texturizing treatment involving cooling and working e.g. in a Votator® equipment or any other equipment well known in the art. The products can also be produced starting from an O/W emulsion which is allowed to invert and give a W/O emulsion.

The invention will now be illustrated in the following Examples.

EXAMPLES

In the following examples margarines were produced from 84% of a fat composition according to the invention (or alternatively a fat composition used for comparison), 0.16% of lecithin, 0.10% of beta carotene, 0.6% of skim milk, 1% of salt and about 14.14% of water.

The margarines were prepared by cooling and plasticizing the above composition using an equipment consisting of 3 scraped-surface heat exchangers (A-units) and 2 crystallizers (C-units) arranged in the following sequence
A-A-C-A-C.

The levels of the most relevant fatty acids of the diglycerides present in the fat compositions described in the following examples and the ratios of diglycerides to unsaturated monoglycerides and the ratios of diglycerides to saturated monoglycerides are shown in Table 2.

The margarine samples were stored for 3 days:
(a) at 5° C., constant temperature
(b) under alternating storage conditions: 12 hours at 5° C., followed by 12 hours at 20° C.

Margarines were evaluated by objective measurements and by a panel of experts on similarity to butter as regards the plastic/elastic texture and melting properties at 5° C. (unless stated otherwise).

EXAMPLES I–III

Fat blends were produced from:
(1) 35% by weight of hardened rapeseed oil (m.p. 30° C.), randomly interesterified in the presence of 0.1% NaOH and varying quantities of glycerol (as indicated below), at a temperature of 135° C., for 20 minutes. The interesterified mixture was treated with 1% of phosphoric acid solution, neutralized, washed and bleached with 1% of bleaching earth for 20 minutes at 105° C.
(2) 25% by weight of hardened soybean oil (m.p. =36° C.).
(3) 10% by weight of palm oil.
(4) 30% by weight of sunflower oil.

The amount of glycerol in (1) was varied from 0.7 to 1.7% to obtain about 16%, 24%, 33% of diglycerides based on the weight of component (1) and 6%, 9%, 12% of diglycerides based on the total fat blend.

The corresponding amounts of monoglycerides were 0.6%, 1.0% and 1.2% by weight of the total fat blend.

For comparison purposes 2 fat blends A and B and 2 margarines A and B were produced. Fat blend A had substantially the same composition as in the parallel examples I–III, except that 0.2% of glycerol was used and that substantially all the mono- and diglycerides were removed by chromatography on a silica column to achieve a level of less than 0.1% of diglyceride and less than 0.05% of monoglyceride in the total fat blend.

Fat blend B had substantially the same composition as in the parallel examples I–III, except that 0.2% of glycerol was used, which resulted in the formation of 1.5% of diglycerides and 0.2% of monoglycerides.

Both comparative examples show that diglycerides are ineffective at low levels for the purpose of achieving butterlikeness. Moreover, the oral melt properties perceived by a trained panel (salt release and viscosity) were poor in comparison with the examples according to the invention.

Characteristics of the fat compositions and results of the assessment of the various margarines are shown in Table 1.

The texture was assessed using a stainless steel knife with which the products were spread on bread.

The oral melt properties were also assessed by measuring the viscosity of the products (after tempering for 30 minutes at 34° C.) in a Haake viscosimeter at a shear rate of 100 sec.$^{-1}$.

Another method consisted in measuring the salt release temperature i.e. the temperature at which all the salt is released from margarine, which is measured by stirring 1 g margarine with 100 g water which is heated up (1° C./min) from 25° C. to 40° C. The salt released is measured conductometrically.

In the Tables
The N-values reflect the fat solids content determined by NMR as described in J.A.O.C.S., 1971 (1948), p. 7.
The C-values at 5° C. reflect the hardness of the product (expressed in g/cm$^2$ as described in J.A.O.C.S., 36 (1959) p. 345–348).
The texture panel score is given within a scale from 1 to 10. A score of 4 is poor, 5 is just sufficient, 6 means sufficient to good, 7 is good to very good, 8 and higher is very good.

TABLE I

|  | Comparative fat composition A | Comparative fat composition B | Ex. I | Ex. II | Ex. III | Ex. IV |
| --- | --- | --- | --- | --- | --- | --- |
| % Glycerol on (1) | 0.2 | 0.2 | 0.7 | 1.2 | 1.7 | 1.2 |
| Diglyceride | <0.1 | 1.5 | 6 | 9 | 12 | 11 |

TABLE I-continued

| | Comparative fat composition A | Comparative fat composition B | Ex. I | Ex. II | Ex. III | Ex. IV |
|---|---|---|---|---|---|---|
| % on fat blend Monoglyceride % | <0.05 | 0.2 | 0.6 | 1.0 | 1.2 | 0.35 |
| N—values* | | | | | | |
| $N_{10°C.}$ | 42.0 | 42.0 | 45.4 | 42.1 | 42.2 | 43.6 |
| $N_{20°C.}$ | 21.3 | 21.0 | 21.3 | 19.4 | 17.7 | 19.2 |
| $N_{30°C.}$ | 3.6 | 3.3 | 3.6 | 2.9 | 2.4 | 5.0 |
| $N_{35°C.}$ | 0.2 | 0.0 | 0.5 | 0.0 | 0.0 | 0.3 |
| $C_{5°C.}$** | 1650 | 1650 | 1740 | 1830 | 1950 | 1750 |
| Texture panel score (+): | | | | | | |
| at 5° storage | 2.0 | 3.0 | 6.5 | 6.5 | 7.5 | 7.0 |
| at alternating 5°/20° C. storage | 2.2 | 2.8 | 6.0 | 6.5 | 7.8 | 7.2 |
| Viscosity at 34° C. (mPas) | 180 | 135 | 106 | 90 | 80 | 95 |
| Salt release temperature (°C.) | 37.5 | 37.8 | 37.0 | 36.3 | 34.8 | 35.8 |

EXAMPLE IV

A fat blend was produced from 17% of palm oil, 33% of soybean oil hydrogenated to m.p.=36° C. and 50% of an interesterified mixture of 75% of soybean oil hydrogenated to m.p.=28° C. and 25% of palm oil. Interesterification was carried out with 1% of glycerol as described in Examples I–III. 22% of diglycerides and 2.4% of monoglycerides were formed. Part of the monoglycerides was eliminated by treatment with 20% excess of 1 N NaOH, calculated on monoglyceride for 1 hour at 100° C. The interesterified component after the NaOH treatment contained 21% of diglycerides and 0.7% of monoglycerides.

The margarine made according to the method described in Example I exhibited a good butterlike texture and a slightly less good melting behaviour than the margarine of Example III.

Characteristics of the fat composition and results of the assessment of the margarine are shown in Table I.

EXAMPLE V

This Example shows that the butterlikeness is less satisfactory when diglycerides having relatively high levels of mono-cis- and di-cis-unsaturated diglycerides are present.

A fat composition was produced from:
(1) 30% by weight of hardened rapeseed oil (mp=30° C.)
(2) 25% by weight of hardened soybean oil (mp=36° C.)
(3) 10% by weight of hardened bean oil (mp=28° C.)
(4) 35% by weight of a randomly interesterified mixture of 1.5% of glycerol and 98.5% of sunflower oil.

The fat blend contained 11% of diglycerides and about 1.3% of monoglycerides originating from sunflower oil.

The margarine exhibited butterlike texture properties that were less pronounced than those of Examples I–IV (panel score on texture: 3; after alternating storage at 5° C. and 20° C. 4).

The fat solids profile of the fat blend was as follows:
$N_{10}=42.1$; $N_{20}=20.8$; $N_{30}=4.0$; $N_{35}=0.6$.

EXAMPLE VI

This example shows that butterlikeness is less pronounced than in Examples I–IV when diglycerides are produced which have a relatively high level of $C_{12}$–$C_{14}$-saturated fatty acids.

The general procedure of Example I was followed for producing the following fat blend:
25% of hardened rapeseed oil (mp=30° C.)
10% of palm oil
5% of sunflower oil
25% of hardened bean oil (mp=36° C.)
35% of a mixture of 70% of coconut oil and 30% of bean oil interesterified with 1.0% of glycerol.

The fat blend contained 13% of diglycerides and 1.5% of monoglycerides.

Texture properties (panel score): 4.3 when the products were stored at 5° C. and 5.3 after alternating storage at 5° C. and 20° C.

The fat solids profile of the fat blend was:
$N_{10}=39$; $N_{20}=18.7$; $N_{30}=3.1$; $N_{35}=0.2$.

EXAMPLE VII

The general procedure described in Example I was repeated with the following fat blend:
(1) 60% of a mixture consisting of
  14% of soybean oil hardened to mp=65° C.;
  25% of coconut oil;
  66% of soybean oil hardened to mp=36° C.;
  5% of soybean oil hardened to mp=28° C., esterified with 1% of glycerol;
(2) 40% of sunflower oil.

The final fat blend contained 14% of diglycerides and 0.9% of monoglycerides. The margarines exhibited very good butterlike properties (panel score 7.0 after storage at 5° C., 7.0 after storage at alternating temperatures (5° C. and 20° C.).

The fat solids profile was
$N_{10}=35$; $N_{20}=13.5$; $N_{30}=2.7$; $N_{35}=0.0$.

The salt release temperature was 33° C. (which is significantly below body temperature).

EXAMPLES VIII–X

The general prodedure described in Example I was repeated with a fat blend containing:
(1) 4, 8 and 16% of diglycerides prepared from fully hardened palm oil (mp=58° C.);
(2) 84 to 96% of the fat blend of Example I, from which di- and mono-glycerides were substantially removed by chromatography on aluminium oxide using hexane as eluent.

The results (in comparison with Example I) are summarized in Table 3. To eliminate the hardness differences the samples were presented to the panel at different temperatures, at which they all had a C-value of about 1000 g/cm².

Samples with an increased percentage of diglycerides from fully hardened palm oil show (after storage at alternating temperature) a decrease of butterlikeness. Besides, the melting properties were unacceptably bad (high viscosity, no release of salt); these bad properties were due to a high level of $C_{16-22}$-fatty acids (saturated) in the diglycerides.

TABLE 2

|  | Examples | | | | | | |
| --- | --- | --- | --- | --- | --- | --- | --- |
|  | I-III | IV | V | VI | VII | VIII-X | XI |
| $C_{16-22}$ | 14.1 | 26.3 | 10.5 | 13.7 | 24.2 | 97.4 | 40.5 |
| $C_{12-14}$ | 0.4 | 0.5 | 0.2 | 46.5 | 16.8 | 1.3 | 14.2 |
| $C_{18:1}$ } cis | 32.4 | 62.2 | 88.5 | 36.4 | 27.8 | 0.4 | 30.1 |
| $C_{18:2}$ | | | | | | | |
| $C_{18:1}$, trans | 52.0 | 8.2 | — | — | 28.9 | 0.6 | 3.0 |
| others | 1.1 | 2.8 | 0.8 | 3.6 | 2.3 | 0.3 | 11.7 |
| dg/mono(u) (+) | 12 | 45 | 9 | 24 | 28 | >100 | 43.0 |
| dg/mono(s) (++) | 69 | >100 | >100 | 14 | 37 | >100 | 27.0 |

(+) ratio of diglyceride to unsaturated monoglyceride
(++) ratio of diglyceride to saturated monoglyceride

TABLE 3

|  | Example | Comparative Examples | | |
| --- | --- | --- | --- | --- |
|  | I | VIII | IX | X |
| Diglyceride (%) | 0.2 | 4 | 8 | 16 |
| Monoglyceride (%) | 0.1 | 0.3 | 0.6 | 1.4 |
| $N_{10}$ | 42.0 | 41.6 | 43.7 | 49.4 |
| $N_{20}$ | 21.3 | 23.3 | 25.7 | 32.3 |
| $N_{30}$ | 3.6 | 7.4 | 10.1 | 17.0 |
| $N_{35}$ | 0.2 | 3.2 | 6.3 | 13.4 |
| Temperature and texture assessment | | | | |
|  | 10° C. | 10° C. | 17.5° C. | 20° C. |
| C-value (g/cm²) | 1000 | 1050 | 1000 | 1000 |
| Texture panel score: | | | | |
| stored at 5° C. | 3.5 | 5.6 | 6.6 | 5.5 |
| stored at 5° C./20° C. | 2.8 | 4.0 | 4.0 | 2.0 |
| Viscosity at 34° C. (in mPas) | 180 | 280 | 400 | >600 |
| Salt release temp. | 35.4° C. | >40° C. | >40° C. | >40° C. |

EXAMPLE XI

The general procedure as described in Example I was repeated with the following fat blend:
(1) 85% of butterfat (separated from fresh butter);
(2) 15% of butterfat interesterified after addition of 1% of glycerol. The interesterified fat contained 25% of diglycerides and 2.1% of monoglycerides.

The properties of the modified butter prepared from the above fat blend with the method described in Example I have been compared with fresh dairy butter.

The butterlike texture and melting properties of the modified butter according to Example XI were very similar to those of fresh butter, but the modified butter was much better spreadable, especially below 15° C.

We claim:
1. An edible fat composition comprising one or more diglycerides or a mixture of one or more diglycerides and one or more monoglycerides, wherein:

(a) the ratio of diglyceride to saturated monoglyceride exceeds 8:1 and the ratio of diglyceride to unsaturated monoglyceride exceeds 5:1;
(b) the diglycerides are present in a proportion ranging from 5 to 30 wt. % based on the total amount of fat;
(c) the level of saturated fatty acid residues having a chain length varying from 16 to 22 C-atoms in said diglycerides does not exceed 45% based on the weight of the fatty acid residues of said diglycerides.

2. An edible fat composition according to claim 1, wherein the level of $C_{16-22}$ fatty acid residues ranges from 5 to 35 wt. %.

3. An edible fat composition according to claim 1, wherein the level of $C_{12}$- and $C_{14}$-saturated fatty acid residues in said diglycerides ranges from 0 to 35 wt. %, based on the total weight of the fatty acid residues of said diglycerides.

4. An edible fat composition according to claim 3, wherein the level of $C_{12}$- and $C_{14}$-saturated fatty acid residues ranges from 0 to 15 wt. %.

5. An edible fat composition according to claim 1, wherein the level of monocis- and dicis-unsaturated fatty acid residues with a chain length of 18 or more carbon atoms in said diglycerides does not exceed 70 wt. %.

6. An edible fat composition according to claim 5, wherein the level of monocis- and dicis-unsaturated fatty acid residues with a chain length of 18 or more carbon atoms in said diglycerides ranges from 25 to 65 wt. %.

7. An edible fat composition according to claim 1, wherein the level of mono-trans unsaturated fatty acid residues with a chain length of 18 or more carbon atoms varies from 0 to 70 wt. %.

8. An edible fat composition according to claim 7, wherein the level of mono-trans fatty acid residues ranges from 5 to 60 wt. %.

9. An edible fat composition according to claim 1, comprising diglycerides selected from the group consisting of a diglyceride derived from one palmitic or stearic acid and one oleic acid residue, a diglyceride derived from 2 elaidic acid residues and a diglyceride from one elaidic acid and one oleic acid.

10. An edible fat composition according to claim 1, wherein the total fat composition has the following fat solids profile: $N_{10} \leq 55$; $N_{20} = 8-25$; $N_{30} = 0-6$; $N_{35} = 0-3$.

11. An edible fat composition according to claim 1, wherein the diglycerides melt within the range of 20°–40° C.

12. An edible fat composition according to claim 1, wherein the diglycerides are present in an amount ranging from 10 to 20 wt. %, based on the amount of fat crystallizable within the temperature range of 5°–35° C.

13. An edible fat composition according to claim 1, wherein the ratio of diglycerides to saturated monoglyceride exceeds 10:1 and the ratio of diglycerides to unsaturated monoglyceride exceeds 6:1.

14. An edible fat composition according to claim 1, wherein the diglycerides and the mixture of di- and monoglycerides consist of the residual product from the distillation of a mixture of mono-, di- and triglycerides, which has been subjected to fractionation to isolate a diglyceride fraction substantially free from monoglycerides.

15. An edible fat composition according to claim 1, wherein the diglycerides or the mixture of di- and monoglycerides are obtained by glycerolysis of the fat blend or of a component of the fat blend of the edible fat composition.

16. An edible fat composition according to claim 1, wherein the diglycerides or the mixture of di- and monoglycerides are obtained by (i) interesterification of the edible fat or of a component of the edible fat in the presence of an alkali hydroxide and an amount of glycerol ranging from 0.5 to 3%, based on the weight of the fat subjected to glycerolysis, and (ii), removal of any excess of monoglyceride formed during the interesterification by chemical or physical methods.

17. An edible fat composition according to claim 1, wherein the fat composition contains butterfat.

18. Oil- and water-containing emulsions, wherein said emulsion is a margarine or reduced fat spread, wherein the fat contains an edible fat composition as claimed in claim 1.

* * * * *